Aug. 30, 1966  S. G. JACKSON ET AL  3,270,279
METHOD AND APPARATUS FOR DETERMINING THE MOISTURE CONTENT OF
COTTON BY SAMPLING WITH A SUCTION
Filed Feb. 7, 1964  2 Sheets-Sheet 1

INVENTORS
SAMUEL G. JACKSON
OCIA W. POND
BY Toulmin & Toulmin
ATTORNEYS

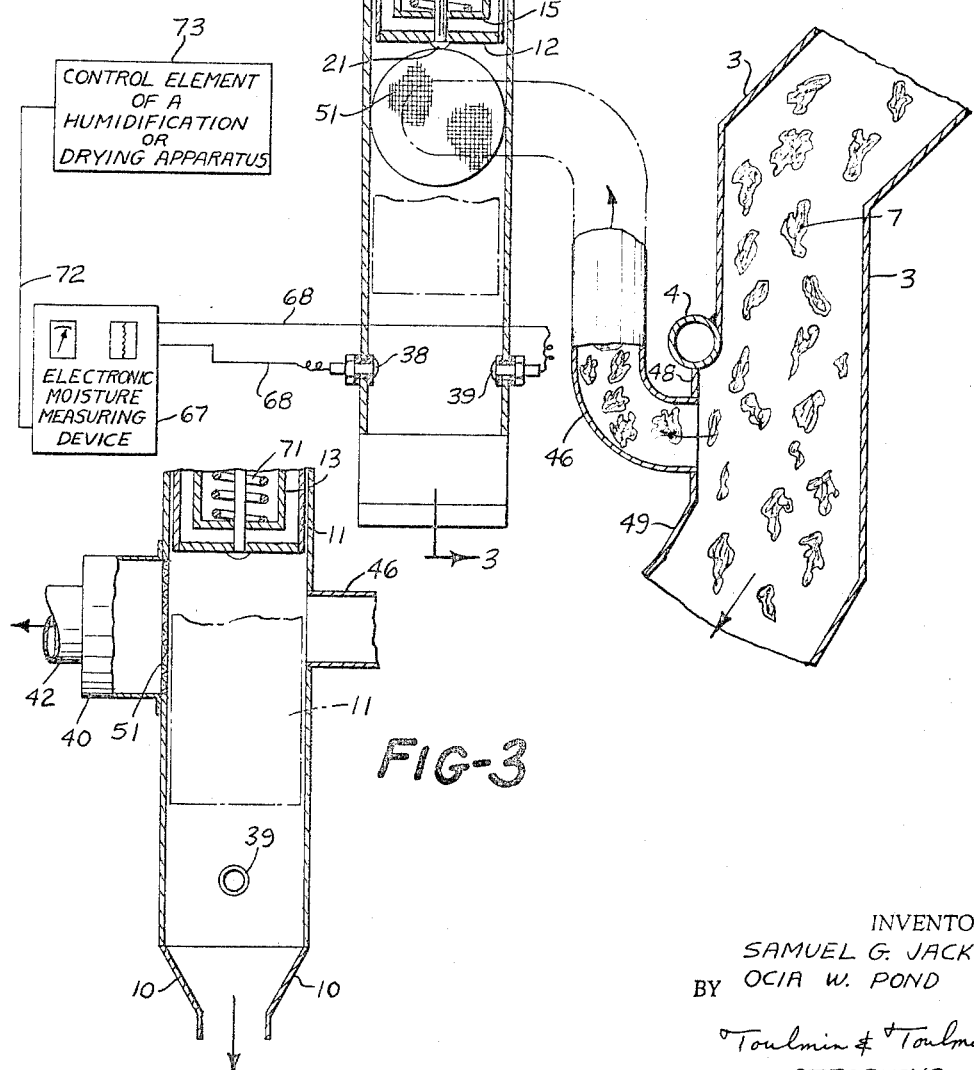

United States Patent Office 3,270,279
Patented August 30, 1966

3,270,279
METHOD AND APPARATUS FOR DETERMINING THE MOISTURE CONTENT OF COTTON BY SAMPLING WITH A SUCTION
Samuel G. Jackson and Ocia W. Pond, Lubbock, Tex., assignors to Samuel Jackson Manufacturing Corp., Lubbock, Tex., a corporation of Texas
Filed Feb. 7, 1964, Ser. No. 343,394
8 Claims. (Cl. 324—61)

The present invention relates to cotton treating machines such as seed separators, cotton gins, etc. and more particularly to apparatus by which the moisture content of cotton samplings taken from the various machines on a continuous basis can be measured and if desired, can be recorded in the form of a graph.

The moisture content of cotton fiber during the various processes which take place in the gin plant is important. The optimum moisture content for cleaning cotton under treatment is different from the optimum for ginning or lint cleaning after ginning. The moisture content of the cotton fiber as the seed cotton enters the gin stand is particularly critical. As the moisture content at this point becomes lower, the fibers become more brittle and are more likely to become shortened and damaged during the ginning and subsequent lint process.

It has been heretofore impossible to measure the moisture content at this point automatically. The only practical method of measuring cotton moisture content in a gin is by measuring the electrical conductance of the cotton fiber. To use this method a representative sample of the cotton must be manually pressed against electrodes with a fairly uniform pressure. The electric circuits which are used to measure this high resistance are rather sensitive so that the sample and electrodes must be shielded from the moving seed cotton which is usually charged with static electricity. Since the seed cotton falls from the extractor feeder into the gin stand, the problem becomes even more difficult.

Inside the gin stand, the half ginned seed cotton assumes the form of a hollow cylinder which is rapidly rotated by the action of the gin saws protruding into it through the ginning ribs through which they claw the cotton fibers from the seed. For a number of years, it was attempted to measure the moisture content by mounting an insulated electrode in the plate which presses firmly against the rotating seed roll. This had the advantage of uniform pressure of the seed cotton against the electrode, but the method was not entirely successful. It appears that the moving seed roll generated a considerable static charge on the electrode and the internal moisture content of the cotton seed affected the reading due to the removal of most of the cotton fiber from the seed roll and also due to the length of time the cotton seeds remained in the seed roll.

The primary object of the present invention is to provide an improved method and apparatus for measuring the specific moisture in cotton, contemporaneous with the treatment of the cotton.

Another object is to provide an improved method and apparatus for continuously sampling representative portions of the cotton undergoing treatment, by diverting these portions from a stream of cotton undergoing treatment and determining the moisture content, in a continuous manner, of the cotton samples.

Still another object is to provide an improved method and apparatus for retracting by suction, representative quantities of cotton from a flowing stream of cotton undergoing treatment and determining on a continuous or batch basis the moisture content of the retracted cotton. This is accomplished by the use of compression on the cotton within a confined space and the automatic measurement of the electrical conductance of the confined cotton which can be translated into terms of moisture content.

Still another object is to provide a moisture determining apparatus for cotton which is adapted to be attached to a standard cotton treating machine and can automatically receive batches of cotton for moisture testing purposes, and then, return the evaluated cotton to the main stream of cotton flowing through the cotton treating machine.

A further object is to provide a method and apparatus for reproducibly determining the moisture percentage in continuous batches of cotton automatically retracted from a flowing stream of cotton undergoing treatment and operated solely by mechanical means without the use of human hands.

The final object is to provide a method and apparatus for automatically withdrawing predetermined amounts of cotton from a flowing stream of cotton undergoing treatment and depositing the withdrawn cotton at a place remote from the cotton treating machine and in a continuous manner, thereupon determining the specific electric conductance of the removed cotton, and translating these determinations into percentage moisture.

Other objects and features will be apparent as the specification is perused in connection with the accompanying drawings in which:

FIGURE 1 represents a fragmentary elevational view of a typical cotton treating machine, shown as an extractor-feeder and to which the improved apparatus for determining percentage of moisture of the cotton is attached;

FIGURE 2 shows a vertical cross-section, but partly in elevation, and partly diagrammatic, of the moisture determining apparatus attached to the feeder apron between the extractor and the gin. This figure also shows, in diagram, a standard form of electronic moisture measuring device equipped with an indicating meter and recorder, in addition to a control circuit for regulating the moisture imparted into or dried from the cotton being processed;

FIGURE 3 is a fragmentary cross-sectional view taken along lines 3—3 but with a small portion left in elevation for clearness;

FIGURE 5 represents an enlarged cross-sectional view of a quick release valve useful in suddenly relieving the interior of the cotton-compressing device of residual pressure.

Figure 1:
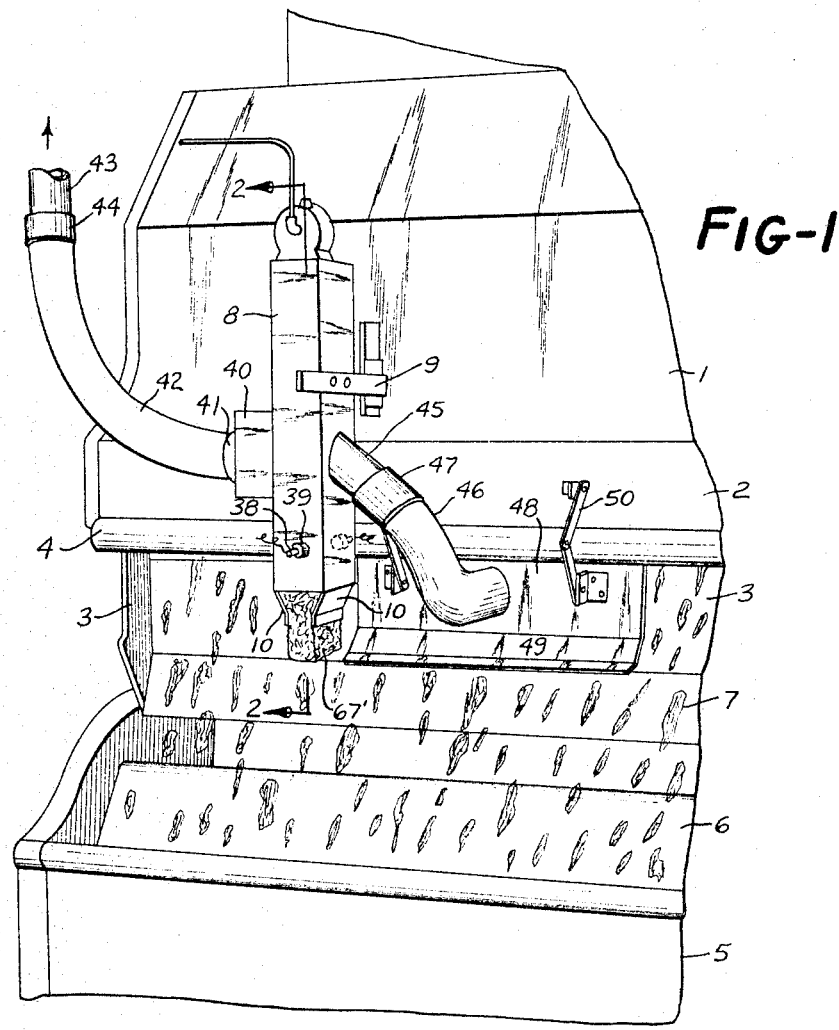

Referring more particularly to FIGURE 1, reference character 1 indicates a typical form of an extractor-feeder provided with a hood 2 and an apron 3 over which the processed cotton falls by gravity. There is a longitudinally extending huller front of a gin stand 6 for receiving the treated cotton. The cotton, indicated at 7, is dropped into the gin stand. It has been pointed out that it is desirable that the moisture content of the cotton about to be ginned should be determined and corrected in any suitable manner because if this moisture becomes less than a predetermined amount, the fibers become more brittle and are more likely to be shorted and damaged during the ginning process so that the ginned cotton would have less value on the market.

In accordance with one aspect of our invention, samples of the cotton are taken from the extractor-feeder 1, or any other treating machine prior to the gin stand or any other device of the treatment line. These samples flow continuously from the position of the feeder apron and are removed therefrom without being touched by hand to a position remote from any static inducing effect of the treating machines of the line. At this remote position, the bottom is confined within a space and is compressed under a constant and predetermined pressure between two electrodes by which the conductance of the cotton is determined on a batch basis. The specific moisture content can be made known from these determinations through well-known electrical devices.

As stated hereinbefore, the moisture determining device operates on the basis of changes in electrical conductance as measured between two oppositely positioned charged electrodes and this change in conductance is translated into changes of moisture percentage. For this purpose we have provided an upright metal tubular enclosure or cylinder 8, which has considerable length, is smooth on the inside and is supported from the feeder machine by means of a bracket. The bottom of the enclosure or compartment is provided with downwardly and inwardly extending wing members 10 on two sides in order to provide some resistance to the cotton contained in the enclosure and which is forced downwardly or extruded by means of a piston.

The latter constitutes a hollow piston 11 (FIGURE 2) of metal which fits fairly snugly but slidably within the enclosure 8. The lower end of the piston is closed by a plate 12 but the upper end is left open. Within the hollow piston, there is a metal cylinder 13 closed at both ends as indicated at 14 and 15 respectively and the upper end of the cylinder is riveted as at 17 to a plate 18. This plate closes the upper end of the enclosure 8 and for convenience, the latter may be provided with a flange 19 to which the plate 17 can be bolted as indicated at 20. Considerable clearance can be provided between the cylinder 13 and the nearest surfaces of the piston 11. A rigid rod 16 extends through the cylinder 13 and is riveted, as indicated at 21, to the lower plate 12 of a piston and, at its upper end, carries a piston head 22. Thus, there is a confined chamber between the upper end member 14 and head 22 within the cylinder 13. The plate 18 is provided with an upstanding boss 23 for receiving a metal tube 24, and connected in this tube, there is a quick release valve 25 of which an enlarged sectional view is shown in FIGURE 5. As shown in this detail figure there are two vertical openings indicated at 26 and 27 in line with one another and both in communication with a horizontal opening 28 which extends through a projection 29. At the position where the openings 26, 27 and 28 join together there is a small diagonally extending chamber 30 in which a diaphragm 31 of soft rubber is inserted. The arrangement is such that air under pressure can be forced through the opening 26 and will press the soft diaphragm 31 against the opening 28, thereby sealing off this opening but will allow the air to pass freely through the opening 27 in the vertical direction. However, air under pressure flowing upwardly through the opening 27 will now cause the diaphragm to move to the left and to seal off the opening 26 but allowing the air to pass freely through the horizontal opening 28. The valve may be termed a quick-release valve since it allows air under pressure to flow downwardly through the valve into the chamber indicated at 32 and seal off the exhaust port 28, and yet, will allow air under pressure to be forced upwardly out of the chamber 32 to be exhausted solely through the opening 28. A pipe 33 is taken from the upper end of the valve 25 to a solenoid valve 34 of well-known construction and the purposes of which will be described hereinafter. The solenoid for the valve is indicated at 35 and the upper arrow 36 indicates the application of compressed air from a suitable continuous supply (not shown). The horizontal arrow 37 indicates the exhaust of air passing through the valve 34 during the operation of the apparatus as a whole as will be described hereinafter.

As shown in FIGURE 1, the enclosure 8 is provided near the bottom with a pair of oppositely positioned electrodes 38 extending into the enclosure and insulated therefrom by a pair of rubber bushings 39 of high resistance insulation material such as Teflon. These electrodes may terminate in the interior of the enclosure in a pair of metal discs the purpose of which will be explained in connection with the circuit diagram in FIGURE 4. About half way up the height of the enclosure 8, there is a horizontally extending and hollow projection 40 having a cylindrical extension 41 over which a flexible hose 42 may be attached. This hose may be of the corrugated rubber type and at its upper end it receives a metal pipe 43 clamped to the hose by an expansible band 44. The pipe 43 leads to any suitable source of vacuum which may be a vacuum pump, but preferably any pipe of the system which is used for cotton suction purposes. At a position directly opposite from the projection 40 there is a metal pipe 45 extending diagonally downward for receiving a flexible rubber hose 46 clamped to the pipe at 47. The pipe 46 passes into a metal plate 48 having an outwardly extending portion 49 over the length of the plate. The plate is held in position at a short distance away from the apron 3 and held in this position by a pair of hinged brackets 50 secured to the outer wall of the hood 2. Thus, the plate 48 can be adjusted toward and away from the apron 3 and held in the adjusted position by means of the brackets. In the plate 48 there is an opening to receive the lower end of the rubber tube 46. Thus, as the locks of cotton 7, fall by gravity between the walls of the hood 2 and over the apron, and assuming that vacuum is applied to the pipe 43, quantities of the falling cotton will be sucked into the pipe 46 and into the enclosure 8 at a position below the piston 12. It is desirable that none of this cotton will enter the pipe 42 as a result of the applied vacuum. For this reason there is a wire mesh screen 51 placed over the open end of the projection 40 where it is attached to the enclosure 8. Thus this mesh member will allow the suction to be exerted on the pipe 46 without permitting any of the cotton to go beyond the enclosure 8.

It was pointed out that the arrow 36 indicates a connection to a source of compressed air (not shown) and the intermittent application of this air to the pipe 33 is controlled by the valve 34 which in turn is under the control of the solenoid 35. This solenoid is connected in a circuit which includes a micro-switch 52 having a retractable roller 53 which is operated by a cam 54. A continuously operated motor 55 operates the cam. Thus, as the cam 54 is rotated, the projection 56 thereon will raise the roller 53 and cause the microswitch 52 to close its contacts which in turn applies current from the source 57 to the coil 35 of the valve 34.

Figure 4:
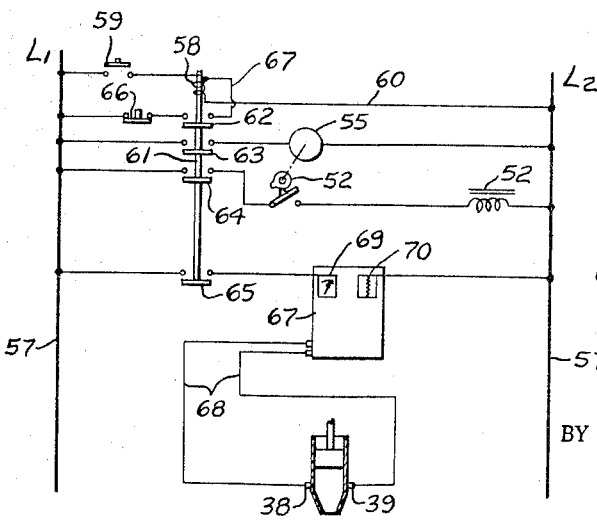
FIGURE 4 represents an electrical circuit that can be used to advantage in operating the continuous moisture determining device by a single push button control.

A suitable electrical circuit has been illustrated in FIGURE 4. An electrical source is indicated at 57 and there is an electromagnetic coil 58 connected at one end through a push button 59 to one side of the line $L_1$ and the other side of the coil is connected through the conductor 60 to the other side of the line $L_2$. The armature 61 of the electromagnet has armatures 62, 63, 64 and 65 attached thereto. The armature 62 forms part of a holding circuit including a push button 66 and a connection 67 between one of the contacts of the armature and the upper terminal of the coil 58. Consequently, when the push button 59 is depressed so that the armature 61 is lifted, contact will be made through the button 66, the armature 62 and the conductor 67 to the upper end of the coil 58, then through conductor 60 to the other side of the line. This holding circuit will keep the armature 61 in its upper position as long as the circuit is not broken at the button 66 and even if its is broken at the button 59 after the coil 58 has been energized to raise the armature.

When the armature 63 is moved upwardly it connects the motor 55 in circuit. The armature 64 upon being raised will energize the microswitch 52 so that as the projection 56 strikes the roller 53, electrical energy is transmitted to the coil 35 of the solenoid valve 34.

The upper movement of the armature 65 will supply energy to a well-known electric moisture measuring circuit device indicated at 67 which receives electrical impulses or rather changes in the amount of current flowing in the wires 68 which lead to the electrodes 38 and 39 (FIGURE 2). These changes in electrical current represent changes in the conduction of the cotton which is spanned by the electrodes at the lower end of the enclosure 8. The changes in conductance can be measured by a microammeter 69 or by a recording ammeter indicated at 70 which also forms part of a typical electronic moisture measuring device. The values as shown by the electrical measuring device 69 and the recording ammeter 70 can be calibrated into specific moisture percentages of the cotton that is contained between the electrodes 38 and 39.

In order to obtain a standard and reproducible measurement of the cotton contained between the said electrodes it is desirable that the pressure applied to the cotton within the confined space of the enclosure 8 shall also be reproducible and in a predetermined amount between batches. Assuming that the push button 59 (FIGURE 4) and the holding circuit 67 have become energized, the source of compressed air indicated by the arrow 36 (FIGURE 2) is permitted to flow through the valve 34 and through the openings 26 and 27 of the quick release valve 25 into the space 32 of the air cylinder 3. The piston head 22 is forced downwardly, pushing on the rod 16 and carrying with it the piston 11. Assuming that a vacuum has been applied to the pipe 43 and the effect of this vacuum is to suck cotton from the space between the plate 48 and the apron 3 through the pipe 46 into the enclosure 8. The cotton sampled will have collected in the lower portion of the enclosure and is subjected to the down pressure exerted by the piston 11. As the piston moves past the screened opening 51, the vacuum is, of course, interrupted or closed off by the piston. The cotton, being tamped down by the action of the piston 11, will be pressed against the electrodes 38 and 39 with a reproducible force and the conductance across the cotton sample will be measured by the device 67.

As the pressure on the cotton exerted by the piston is increased, the tapering wings 10 tend to cause the cotton to pack, as in a bale, and eventually, the packed cotton will be forced out as shown in FIGURE 1. Thereafter, the pressure on top of the piston head 22 will have expended itself as there would be no force reacting against the lower plate 12 of the piston. By this time the projection 56 of the cam 54 will have gone past the roller 53 and will have open-circuited the microswitch 52 to de-energize the solenoid 35. The action of the solenoid 35 and its associated valve in controlling the air supply to and the exhaust of the air from the upper side of the piston 11 is shown in FIGURE 2. When the solenoid is energized, i.e. while the cam 54 is presenting its low surface to the roller 53 the piston is being forced downwardly. However, when the projection 56 will have struck the microswitch the solenoid will have become de-energized to close off the pipe 36 (by spring action—not shown), also serving to connect the pipe 33 to the exhaust opening indicated at 37. Thus, the compressed air in the top of the cylinder as well as in the pipe 33 will be permitted to exhaust into the atmosphere at the position 37.

There is a compression spring 71 located within the cylinder 13 between the piston head 22 and the plate 15. This spring is put under compression when the compressed air is admitted to the space 32. However, when this space is opened to the atmosphere at the valve 34 this spring will force the piston head 22 upwardly at a fast rate. In order that the pressure on the air in the space 32 shall be reduced as quickly as possible when the spring 71 snaps the piston head 22 upwardly, we have provided a quick release valve indicated at 25 which is self-operating. This valve will also assist in getting rid of the excess air which can pass upwardly through the aperture 27 and out through the exhaust 28. Thus the space 32 is exhausted of excess air at a fast rate after the piston 11 has reached its lowermost position to press the sample of cotton between the electrodes 38 and 39. This mechanical and automatic way of first sucking the cotton sample from the stream of cotton leaving the extractor-feeder and into an enclosure removed from the main cotton treating machine prevents any deleterious effect from static electricity which is quite prevalent in and around cotton treating machinery. Obviously, the pipe 46 can be as long as necessary so that enclosure 8 may be located at a considerable distance from the machine 1. Moreover, since after the push button 59 (FIGURE 4) has been momentarily depressed in order to allow the holding circuit 67 to be energized, the operator need exercise no further control over the moisture determining accessory as the device will continue to operate and the piston will intermittently drive downwardly and upwardly against repeated batches of cotton drawn through the pipe 46 until the holding circuit 67 is broken at the push button 66. It is therefore possible to note the needle of the electronic moisture measuring device from time to time or to obtain a running record of the moisture determinations of the chart and all of this can be done without any further control necessary by human hands. Thus the separation is entirely automatic, reproducible, and when the proper translation factors or calibration have been introduced at the apparatus 67 the moisture determinations become quite accurate and on a continuous basis.

If desired, a control can be taken as indicated by the wires 72 to the control element of a humidification or drying apparatus of any suitable type shown as a rectangle 73 in the event that the moisture determinations of a given batch of cotton is shown to be too high or too low from a desired standard and automatic changes need be made in the apparatus which controls the introduction of the moisture into the cotton being processed.

While we have shown and described a continuous method, operable automatically, for determining the moisture of cotton by its specific resistance or conductance factor, it is apparent that other forms of moisture determination in accordance with the principles of our invention may be employed. For example, the dielectric constant or factor may be used in connection with radio frequency applied to the electrodes 38, 39. The latter would be greatly enlarged to constitute condenser plates and would be insulated from the sampler 8 and from the seed cotton. The two plates would form a capacitor, the capacitance of which would be measured by a resonant electronic circuit. Since the physical dimensions of the capacitor remain fixed, the capacitance would be determined by the dielectric constant of the material between the plates. The dielectric constant varies greatly with the moisture content of the material. The variations in this constant can be applied to and indicated on the moisture measuring device 67 to determine whether any changes in the humidity of the air supplied to the cotton would be necessary.

It will be understood that various modifications and arrangements in structure could be made without departing from the spirit of our invention and, accordingly, we desire to comprehend such modifications and substitutions of equivalents as may be considered to come within the scope of the appended claims.

What is claimed is:

1. In the art of determining the specific moisture content of the cotton being processed, simultaneously and continuously conducting the operation of sucking a limited amount of cotton by vacuum from the flow of cotton being processed, extruding the removed cotton through a restricted space, measuring a specific electrical property of the removed cotton while being extruded, and translating the measured electrical property into terms of specific moisture content.

2. The invention as defined in claim 1 with the additional step of returning the removed cotton to the flow of cotton being processed.

3. The invention as defined in claim 2 with the addition of controlling the moisture content of the cotton responsive to the determination of its specific moisture content.

4. In a cotton processing machine having
 (a) an apron over which the cotton falls by gravity,
 (b) the improvement comprising in combination with the above,
 (c) a cylinder attached to the cotton processing machine,
 (d) a pipe extending from the cylinder to the apron area of the machine,
 (e) means attached to the cylinder for applying a vacuum to the cylinder,
 (f) a piston in the cylinder at one end thereof,
 (g) means attached to the cylinder for reciprocating the piston in the cylinder,
 (h) means attached to the cylinder for restricting the flow of cotton therethrough so that reciprocation of the piston compresses the cotton in the cylinder before the cotton is extruded from the cylinder,
 (j) means attached to the cylinder for measuring a specific electrical property of the compressed cotton, and
 (k) connected to said means for measuring, means for translating said measurement into terms of specific moisture content.

5. The invention as defined in claim 4 with the addition of
 (m) means for controlling the moisture content of the cotton before it falls over the apron,
 (n) said means for controlling connected to and regulated by said means for translating.

6. The invention as defined in claim 4 wherein
 (m) said means for restricting the flow is adjacent said apron so that as the cotton is extruded from the cylinder it is returned to the flow of cotton in the processing machine.

7. A machine for measuring the specific moisture of cotton being processed in a cotton gin comprising:
 (a) a cylinder,
 (b) a piston in the cylinder at one end thereof,
 (c) means attached to the cylinder for reciprocating the piston in the cylinder,
 (d) wing members attached to the cylinder on the other end from the piston,
 (e) said wing members extending inward to offer resistance to the flow of cotton and restrict the cotton from leaving the cylinder,
 (f) a pipe connected to the cylinder between the piston and wing members,
 (g) said pipe extending to a cotton processing machine to receive cotton therefrom,
 (h) means attached to the cylinder for applying a vacuum to the cylinder to suck cotton into the cylinder through said pipe,
 (j) means attached to the cylinder between the pipe and wing members for measuring a specific electrical property of the compressed cotton, and
 (k) connected to said means for measuring, means for translating said measurement into terms of specific moisture content.

8. The invention as defined in claim 7 with the addition of
 (m) means for controlling the moisture content of cotton
 (n) connected to and regulated by said means for translating.

References Cited by the Examiner
UNITED STATES PATENTS

| | | | |
|---|---|---|---|
| 2,277,953 | 3/1942 | Christensen | 324—61 |
| 2,665,409 | 1/1954 | Rogers | 324—61 |
| 2,993,168 | 7/1961 | Burnette | 324—61 |

WALTER L. CARLSON, *Primary Examiner.*

E. E. KUBASIEWICZ, *Assistant Examiner.*